US012456763B2

United States Patent
Zhang et al.

(10) Patent No.: US 12,456,763 B2
(45) Date of Patent: Oct. 28, 2025

(54) SYSTEMS AND METHODS FOR BATTERY CELL FORMATION

(71) Applicant: Rivian IP Holdings, LLC, Plymouth, MI (US)

(72) Inventors: Qinglin Zhang, San Jose, CA (US); Amir Masoud Bozorgi, Cupertino, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 524 days.

(21) Appl. No.: 18/147,424

(22) Filed: Dec. 28, 2022

(65) Prior Publication Data

US 2024/0222722 A1 Jul. 4, 2024

(51) Int. Cl.
*H01M 10/44* (2006.01)
*H01M 10/46* (2006.01)
*H01M 10/48* (2006.01)
*H01M 50/51* (2021.01)
*H02J 7/00* (2006.01)

(52) U.S. Cl.
CPC ......... *H01M 10/446* (2013.01); *H01M 10/46* (2013.01); *H01M 10/48* (2013.01); *H01M 50/51* (2021.01); *H02J 7/0069* (2020.01)

(58) Field of Classification Search
CPC ............ H01M 10/446; H01M 10/441; H01M 10/448; H01M 10/46; H01M 10/48; H01M 10/482; H01M 50/51; H01M 50/509; H01M 50/505; H02J 7/0069
See application file for complete search history.

(56) References Cited

U.S. PATENT DOCUMENTS

| | | | |
|---|---|---|---|
| 6,291,972 B1 | 9/2001 | Zhang | |
| 7,135,836 B2 | 11/2006 | Kutkut et al. | |
| 9,787,125 B2 * | 10/2017 | Ji | H02J 7/007184 |
| 2012/0153898 A1 | 6/2012 | Michalske et al. | |
| 2014/0004297 A1 | 1/2014 | Weisberg | |
| 2015/0380959 A1 * | 12/2015 | Chang | H02J 7/0019 320/118 |
| 2022/0314833 A1 * | 10/2022 | Jiang | H02J 7/007 |

* cited by examiner

*Primary Examiner* — Raymond Alejandro
(74) *Attorney, Agent, or Firm* — Foley & Lardner LLP

(57) ABSTRACT

Battery cell formation can include forming a SEI layer in a battery cell, evaluating the cell quality, grading the cells and removing any defect cells. A first switch can connect a first terminal of a battery charger with a first terminal of a first cell. A second switch can connect a second terminal of the first cell with a third switch. The second switch can connect a second cell with a first terminal of the battery charger. The third switch can connect the second switch with a first terminal of the second cell. A fourth switch can connect a second terminal of the second cell with a second terminal of the battery charger. The charger can provide a current to the first cell and to the second cell via the first switch and the third switch for battery cell formation of the first battery cell and the second battery cell.

20 Claims, 11 Drawing Sheets

SYSTEMS AND METHODS FOR BATTERY CELL FORMATION

INTRODUCTION

Battery cell formation can include an initial charge of the battery cell to form a solid electrolyte interphase layers (SEIs), evaluate cell quality, grade cells, or identify and/or remove defect cells.

SUMMARY

This disclosure is generally directed to formation of battery cells. Multiple battery cells connected in a series configuration can be charged/discharged by a single DC-DC converter. Since the battery cells are connected in series, a current for charging multiple battery cells can be the same, and a voltage can be higher (e.g., the voltage can be the sum of the voltage of the individual battery cells). Because the voltage of each cell is low (<5V, e.g., 4.2 V), charging multiple battery cells in series can remain below a threshold or a voltage of a charger (e.g., less than 500 volts). Switches can selectively isolate one or more battery cells. For example, a series connection switch can open to disconnect a battery cell from a series string, and a battery bypass switch can close to connect other battery cells of the series string to each other or to a terminal of the battery charger.

At least one aspect is directed to a system. The system can include a first switch. The first switch can to connect a first terminal of a battery charger with a first terminal of a first battery cell. The system can include a second switch. The second switch can connect a second terminal of the first battery cell with a third switch. The second switch can connect a second battery cell with the first terminal of the battery charger. The system can include a third switch. The third switch can connect the second switch with a first terminal of the second battery cell. The system can include a fourth switch. The fourth switch can connect a second terminal of the second battery cell with a second terminal of the battery charger. The system can include the battery charger. The battery charger to can provide a current to the first battery cell and to the second battery cell via the first switch and the third switch for battery cell formation of the first battery cell and the second battery cell.

At least one aspect is directed to a system. The system can include a first switch. The first switch can connect a first terminal of a battery discharger with a first terminal of a first battery cell. The system can include a second switch. The second switch can connect a second terminal of the first battery cell with a third switch. The second switch can connect a second battery cell with the first terminal of the battery charger. The system can include a third switch. The third switch can connect the second switch with a first terminal of the second battery cell. The system can include a fourth switch. The fourth switch can connect a second terminal of the second battery cell with a second terminal of the battery discharger. The system can include the battery discharger. The battery discharger can receive a current from the first battery cell and from the second battery cell via the first switch and the third switch for battery cell formation of the first battery cell and the second battery cell.

The method can include closing a first switch to connect a first terminal of a battery charger to a first terminal of a first battery cell. The method can include opening a second switch between the first switch and a third switch. The method can include closing the third switch to connect the second terminal of the first battery cell to a first terminal of a second battery cell. The method can include opening a fourth switch between the third switch and a second terminal of the battery charger. The method can include providing a current to the first battery cell and to the second battery cell via the first switch and the third switch for battery cell formation of the first battery cell and the second battery cell.

At least one aspect is directed to a system. The system can include a first switch. The first switch can to connect a first terminal of a battery charger with a first terminal of a first battery cell. The system can include a second switch. The second switch can connect a second terminal of the first battery cell with a third switch. The second switch can connect a second battery cell with the first terminal of the battery charger. The system can include a third switch. The third switch can connect the second switch with a first terminal of the second battery cell. The system can include a fourth switch. The fourth switch can connect a second terminal of the second battery cell with a second terminal of the battery charger. The system can include the battery charger. The battery charger to can provide a current to the first battery cell and to the second battery cell via the first switch and the third switch to form a first solid electrolyte interface layer in the first battery cell and a second solid electrolyte interface layer in the second battery cell.

At least one aspect is directed to a system. The system can include a first switch. The first switch can to connect a first terminal of a battery discharger with a first terminal of a first battery cell. The system can include a second switch. The second switch can connect a second terminal of the first battery cell with a third switch. The second switch can connect a second battery cell with the first terminal of the battery charger. The system can include a third switch. The third switch can connect the second switch with a first terminal of the second battery cell. The system can include a fourth switch. The fourth switch can connect a second terminal of the second battery cell with a second terminal of the battery discharger. The system can include the battery discharger. The battery discharger to can receive a current from the first battery cell and from the second battery cell via the first switch and the third switch to form a first solid electrolyte interface layer in the first battery cell or a second solid electrolyte interface layer in the second battery cell.

The method can include closing a first switch to connect a first terminal of a battery charger to a first terminal of a first battery cell. The method can include opening a second switch between the first switch and a third switch. The method can include closing the third switch to connect the second terminal of the first battery cell to a first terminal of a second battery cell. The method can include opening a fourth switch between the third switch and a second terminal of the battery charger. The method can include providing a current to the first battery cell and to the second battery cell via the first switch and the third switch to form a first solid electrolyte interface layer in the first battery cell and a second solid electrolyte interface layer in the second battery cell.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of battery cell formation. The various concepts introduced above and discussed in greater detail below may be implemented in any of numerous ways.

The present disclosure is directed to systems and methods of charging cells for battery cell formation. The cell formation can include the formation of a solid electrolyte interphase along the terminals of the battery cells (e.g., along an anode thereof), evaluating battery cell quality (e.g., parameters), grading (e.g., grouping) battery cells, or identifying or removing defective battery cells. The battery cells can be charged in series to reduce an input power of a battery charger, relative to parallel configurations. The condition of each battery cell can be monitored. The charging of the series combination of battery cells can be halted in response to a cell voltage or other condition. In series operation, the voltage of the battery charger can be adjusted for the series combination of battery cells, rather than on a cell-by-cell basis. Responsive to a condition of a cell (e.g., a temperature or state of charge (SoC)), a battery cell can be removed from the series circuit. Following removal, the remaining battery cells can continue to be charged according to the adjusted voltage of the battery charger, or a condition of the cells in the series configuration. Various switches intermediate to the battery charger and the battery cells can selectively actuate to connect or disconnect the battery cells from a series connection, such as to bypass cells, or disconnect a battery charger from battery cells during an adjustment of a battery charger voltage.

The disclosed solutions have a technical advantage of decreased resistive losses during cell formation, which can save electrical energy and potentially reduce emissions of greenhouse gasses. The disclosed solutions can employ less wire than parallel processes. For example, a same diameter wire can be employed, which are shorter compared to parallel methods (because, for example, a portion of the wire or other conductors can connect cell-to-cell rather than charger-to-cell). The disclosed systems and methods can prevent overcharging of one or more battery cells, or detect a capacity of like battery cells to meet battery module or pack requirements. The disclosed systems and methods can decrease a dwell time of the battery cells between wetting and formation (e.g., by reducing delays imposed by non-conforming cell removal) and otherwise control the formation process with respect to temperature, voltage, or current, which can increase an SEI quality and lead to increased battery cell life, relative to methods which require intervention to replace non-conforming or unmatched battery cells.

Figure 1:
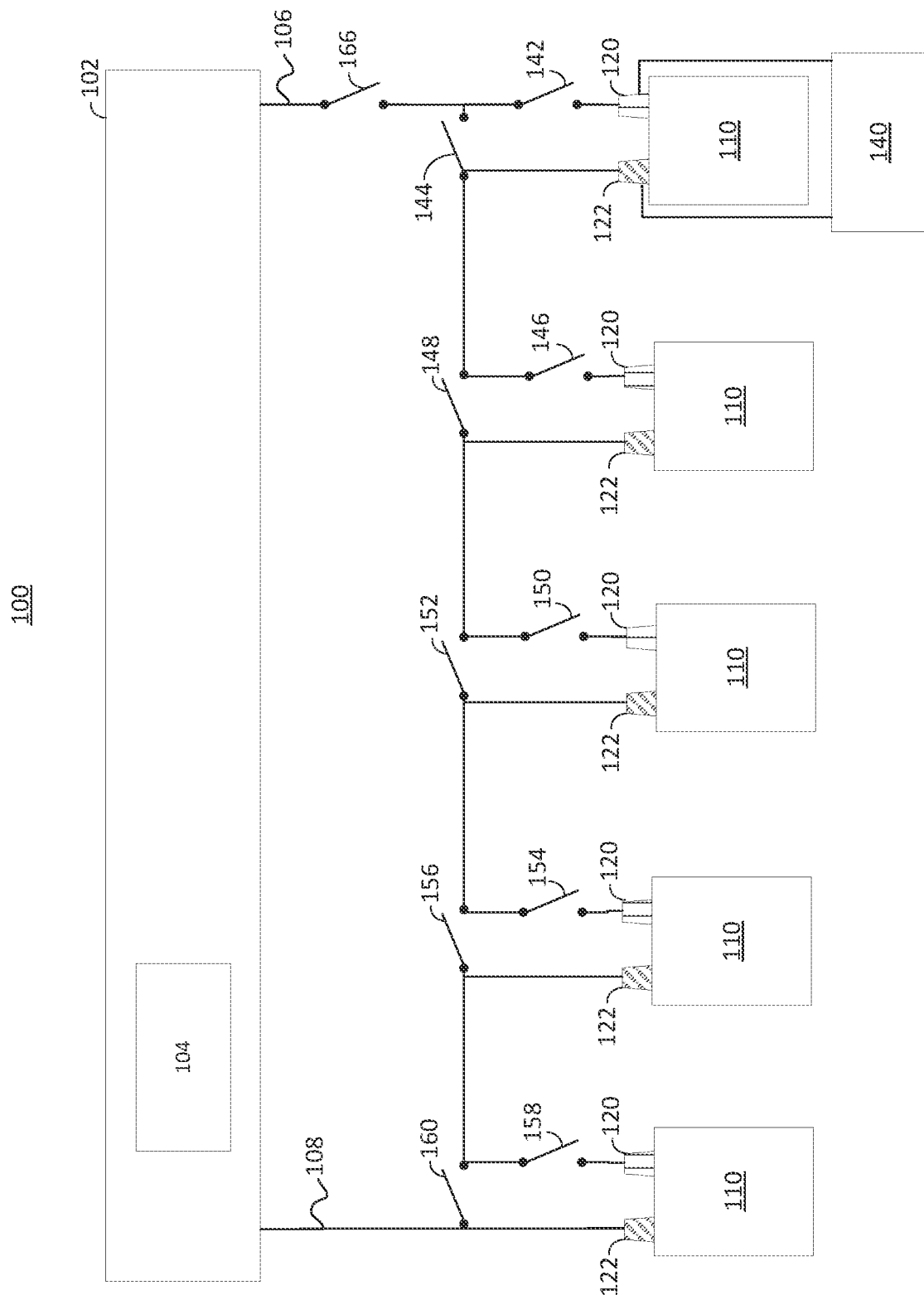
FIG. 1 depicts an example system including a battery charger interfacing with battery cells via various switches.

FIG. 1 depicts an example system 100 including a battery charger 102 interfacing with battery cells 110 via various switches. The battery charger 102 can include or interface with at least one controller 104 to actuate the various switches. The battery charger 102 can include or interface with at least one sensor 140 to detect a condition of the battery cells 110. One or more components of the system 100 (e.g., the controller 104) can include a processing unit or other logic device such as a programmable logic array engine, or module configured to communicate with a data repository or database. The data repository or database can store instructions for the one or more processors, thresholds, or information related to components of the system. For example, a battery cell condition or sensor data can be stored by the controller 104. The controller 104 can execute one or more instructions incident to a detected or stored condition of the battery cells 110. The switches, sensors 140, or controllers 104 can be separate components, a single component, or part of the battery charger 102. The battery charger 102 can include hardware elements, such as one or more processors, logic devices, or circuits. For example, the battery charger 102 can include one or more components or structures of functionality of computing devices depicted in FIG. 11.

The battery charger 102 can apply a signal to one or more of the battery cells 110. The signal can be a constant current signal, a constant voltage signal, or another signal. The signal can charge or discharge one or more of the battery cells 110. For example, the battery cell 110 can be charged from a voltage of less than 0.25 volts to a voltage in excess of 2 volts (e.g., to about 3.5 volts, or about 4.2 volts) at a constant current. The signal can be an AC signal or DC signal. The battery charger 102 can adjust a voltage responsive to a command received (e.g., by the controller 104). The battery charger 102 can include one or more instances, rails, or input/outputs, any of which may be referred to as a battery charger 102. For example, a battery charger 102 can include five output or input rails (e.g., synchronized outputs, isolated outputs, or outputs having an electrically connected ground). The battery charger 102 can provide a charging current in a first mode of operation, and a discharging current in a second mode of operation.

The controller 104 can receive information indicative of a condition of the battery cell 110. For example, the sensor 140 can detect a condition of the battery cell 110 and convey the condition to the controller 104. The sensor data can include a temperature, current, voltage, state of charge, impedance, or other parameters of or associated with the battery cell 110. The parameters of the battery cell can be any input to the controller such as sensor data associated with one or more battery cells 110. The parameter, such as an open circuit voltage or temperature can be an input to the controller 104. An output of the controller 104 can include a switch to remove or indicate a presence of a nonconforming battery cell 110. The sensor data can include a user input associated with the battery cell. For example, a user can select a battery cell for grading or removal via a user interface. The controller 104 can determine a capacity, internal resistance (IR), or other condition of the battery cell 110 based on the sensor data. The controller 104 can indicate a grouping for the battery cells 110 based on the detected/determined condition of the battery cells. For example, the battery cells 110 can be grouped according to an internal resistance (e.g., a direct current internal resistance (DCIR) or alternating current internal resistance (ACIR)), capacity (e.g., state of charge), user input, or functionality. ACIR can be determined by applying a 1 kilohertz square wave or sinusoidal signal to the battery cell 110 and detecting a condition thereof. DCIR can be inferred based on an open circuit voltage (OCV) of the battery cell 110 during or subsequent to the application of the DC signal.

The controller 104 can receive, determine, or adjust a threshold or range. The controller 104 can compare a condition of the battery cell 110 to the threshold or range. The controller 104 can group battery cells based on a condition thereof, such as to group battery cells with other battery cells 110 in a same range or threshold, or otherwise classify the battery cells 110. For example, one or more battery cells 110 can be classified for increased aging, wetting, or recycling.

The controller 104 can group the first battery cell 110, second battery cell 110, third battery cell 110, the fourth battery cell 110, and the fifth battery cell 110. The battery cells 110 can be connected to the battery charger 102 based on the grouping thereof. Groupings can be of various sizes (e.g., five battery cell groupings, eight battery cell groupings, or ten battery cell groupings). The battery cell groupings can be connected in series or parallel. For example, a first switch 142 can connect a first terminal 106 (e.g., cathode) of the battery charger 102 to a first terminal 120 of the first battery cell 110. A second switch 144 can connect a second terminal 122 of the first battery cell 110 to the first switch 142. For example, the second switch 144 can be closed to bypass the first battery cell 110 from any other battery cells 110 connected to the battery charger 102 in a series configuration (e.g., to a second terminal 108 of the battery charger 102). Each of a third switch 146, fifth switch 150, seventh switch 154, and ninth switch 158 can connect a second battery cell 110, third battery cell 110, fourth battery cell 110 or fifth battery cell 110, respectively, in the series configuration (e.g., the first terminals 120 thereof). Each of a fourth switch 148, sixth switch 152, eighth switch 156, or tenth switch 160 can bypass the respective second battery cell 110, third battery cell 110, fourth battery cell 110, or fifth battery cell (e.g., by connecting second terminals 122 of two or more of the battery cells 110), respectively.

Additional or fewer switches can be included in the system 100. For example, additional or fewer switches can include or bypass additional or fewer battery cells 110. The bypass can remove one or more battery cells 110 from a series string of battery cells 110. The bypass can include opening a series connection switch (e.g., the first switch 142 or the fifth switch 150) to remove a battery cell 110 from the series combination of battery cells 110. The bypass can include closing a bypass switch (e.g., the second switch 144 or sixth switch 152) to reconnect the other battery cells 110 of the series combination to each other or to the battery charger 102. For example, an eleventh switch 166 can intermediate the first terminal 106 of the battery charger 102 and the first switch 142. The switches can include one or more switch types. For example, the switches can include contactors, relays, mechanical construction, solid state, or of other types. The switches can be normally open or normally closed. The switches can include an interface to receive an actuation command or signal from a controller 104. For example, the include a transducer to convert a signal received from the controller 104 to an actuation of the switch (e.g., a mechanical or electrical actuation). The switches can include an output to indicate a condition (e.g., position) thereof. For example, the switches can include or interface with a condition sensor to convey a position of the switch to the controller 104.

A sensor 140 can detect a condition associated with one or more of the battery cells 110. For example, sensors 140 can be disposed across each of the battery cells 110. The sensor 140 can be intrinsic to or communicatively coupled with one or more battery cells 110, battery chargers 102, or controllers 104. Prior to, during, or subsequent to causing a signal application to the battery cell 110, the controller 104 can monitor a condition of the battery cells 110. For example, the sensor 140 can convey sensor data to the controller 104. The controller 104 can infer a condition of the battery cell such as a state of charge (SoC), capacity, grade, or temperature of the battery cell 110 incident to the receipt of sensor data. The controller 104 can cause the actuation of the switches incident to an inference of a condition of the battery cell 110 based on the sensor data.

The actuation can include opening a series connection switch (e.g., the first switch 142, the third switch 146, the fifth switch 150, the seventh switch 154, or the ninth switch 158) to disconnect a first terminal 120 of a battery cell 110 from a battery charger 102 or other battery cells 110. The actuation of the series connection switch can open the series connection between the battery cells 110 and the battery charger which can arrest a current between the battery cells 110 or the battery charger 102. A bypass switch (e.g., the second switch 144, the fourth switch 148, the sixth switch 152, the eighth switch 156, or the tenth switch 160), can close to reconnect the series connection between the battery cells 110 and the battery charger, absent the bypassed battery cell. For example, the seventh switch 154 can open and the eighth switch 156 can close to bypass a fourth battery cell. Some switches can be omitted (e.g., to reduce a complexity of a system 100). For example, each of the bypass switches or the series connection switches can be omitted, and the eleventh switch 166 can be opened responsive to a detected condition.

Figure 2:
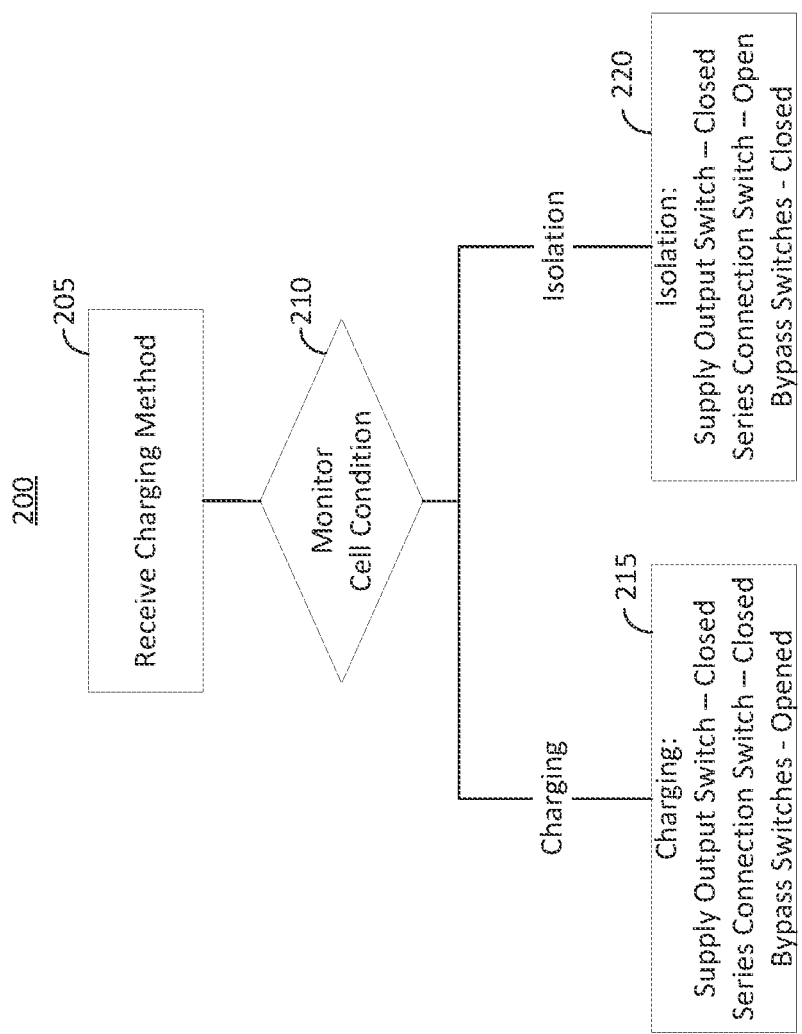
FIG. 2 depicts an example flowchart for a method of charging the various battery cells.

FIG. 2 depicts an example flowchart for a method 200 of charging the various battery cells 110. For example, the method 200 can employ the system of FIG. 1, or another system having additional or fewer battery cells 110 connectable in series. The first switch 142, third switch 146, fifth switch 150, seventh switch 154, and ninth switch 158 are referred to collectively as series connection switches. The second switch 144, fourth switch 148, sixth switch 152, eighth switch 156, and tenth switch 160 are referred to bypass switches (e.g., corresponding to the respective battery cells 110, and can thus also be referred to as battery bypass switches). The eleventh switch 166, or another switch actuated to arrest the current flow from the battery charger 102 can be referred to as the supply output switch. Such naming is intended merely for purposes of brevity, and is not intended to be limiting. Switches can serve various functions according to a controller input, or a number or location of battery cells 110. For example, in one or more modes of operation the battery charger 102 can receive power from the battery cells 110 to discharge said battery cells 110. The supply output switch can arrest an input to the battery charger.

At ACT 205, a charging method is received or determined (e.g., by a controller 104). For example, the controller 104 can determine the charging method based on a number of battery cells 110 disposed in a battery tray, a command received via a network connection, or via a user interface. The charging method can be a series charging method and can include a charging profile such as a number of charge or discharge cycles, a charging rate, a target SoC, or the like. The controller 104 can determine the charging method according to sensor data associated with various battery cells 110. The controller 104 can cause one or more supply output switches to open to arrest a current flow between the battery charger 102 and a group of battery cells 110 in a series configuration. The controller 104 can energize an output terminal to an operating voltage to charge or discharge the group of battery cells 110. For example, the battery charger 102 can energize to the operating voltage based on the number of battery cells 110 (e.g., a multiple of a battery voltage to be applied across the terminals of the battery cells 110). The controller 104 can receive an indication of the voltage of the battery charger 102 from a sensor 140 disposed across the terminals of the battery charger 102, or can impose a delay for the battery charger 102 to reach an operating voltage, such as a 50 millisecond delay, a 100 millisecond delay, or a 150 millisecond delay. Incident to the battery charger 102 reaching an operating voltage, the controller can close the supply output switches to cause the battery charger to exchange power with the battery cells 110. The controller 104 can also cause a delay between a power adjustment and connection of battery cells to the battery charger between other voltage adjustments.

At ACT 210, prior to, during, or subsequent to charging the battery cells 110, the controller 104 determines the battery cell 110 condition. The controller 104 can receive sensor data from the sensor 140 incident to a pre-defined polling frequency of the controller 104, or based on one or more thresholds being exceeded. Sensor data can be indicative of battery cells 110 which are operating within a temperature range, voltage range, current range, or other parameters.

At ACT 215, responsive to sensor data indicating expected operation, the controller 104 can charge or continue to charge the battery cells 110. For example, the controllers 104 can cause the supply output switch or series connection switch to close, or cause the bypass switch to open. The battery charger 102 can apply the operating voltage to the series combination of battery cells 110. Various groups of battery cells can be charged simultaneously. For example, parallel strings of battery cells can be charged in a group of three parallel strings having eight battery cells 110 per series string (8S3P) four parallel strings having ten battery cells 110 per string (10S4P) configuration. A number of parallel cells can be determined according to a power output of the battery charger 102 (e.g., a current thereof). The operating voltage can be a fixed or variable voltage. For example, the operating voltage can be a voltage profile between 0.25 and 4.5 volts per cell, and can include a constant current charge for at least a portion of the voltage profile. The voltage profile can include charge and discharge cycles (e.g., to develop a solid electrolyte interphase layer for a battery terminal).

At ACT 220, responsive to a receipt, by the controller 104, of sensor data indicative of the battery cell 110 which is not operating, or not operating similarly to other battery cells 110, the controller can isolate one or more battery cells 110. For example, the battery cell 110 can reach a target SoC prior to other battery cells 110. The controller 104 can cause the supply output switch to close, or open the series switches. The controller 104 can cause the bypass switch to close. For example, the controller 104 can cause a bypass switch associated with the battery cell 110 to close to bypass the battery cell. The controller 104 can cause a delay between the opening of the series switch associated with the battery cell 110 and the closing of a bypass switch associated with the battery cell 110 (e.g., to avoid short circuiting the battery). The controller 104 can receive sensor data indicative of an overheating of the battery cell 110, or a voltage of the battery cell 110 exceeding a threshold. The controller 104 can determine, based on the sensor data, that the battery cell 110 is to be isolated. For example, the controller can determine that a cell having a voltage exceeding a threshold at 99% of an expected SoC is charged, or that a cell having a voltage exceeding a threshold at 2% of an expected SoC is non-conforming and should be removed. The controller 104 can cause an indication to be presented (e.g., via a user interface) to remove the battery cell or otherwise convey a condition of the battery cells 110. For example, the indication can be based on a temperature, voltage, SoC, or current exceeding an upper or lower threshold.

Figure 3:
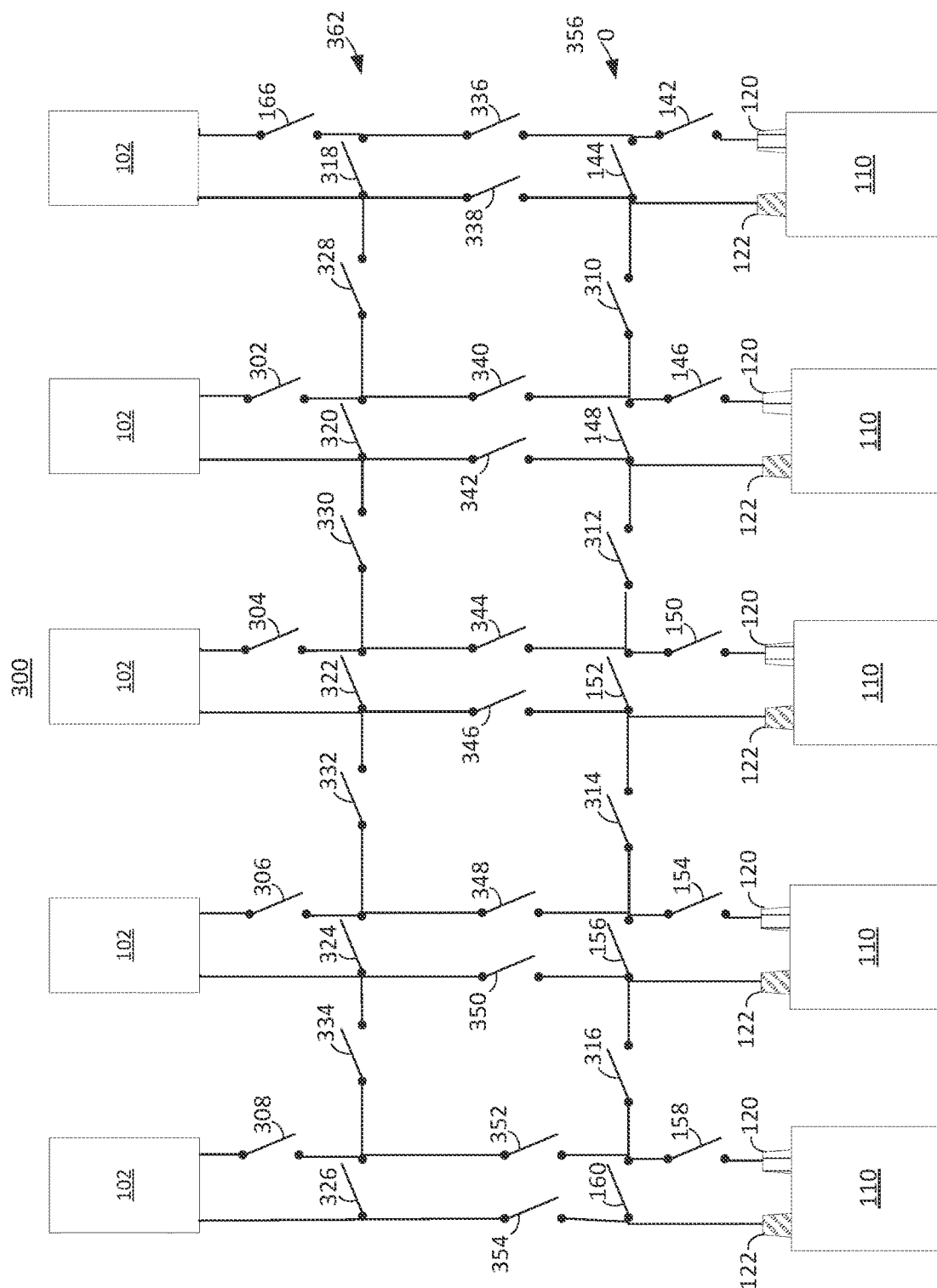
FIG. 3 depicts an example system including battery chargers interfacing with battery cells via various switches.

FIG. 3 depicts an example system 300 including multiple instances of the battery chargers 102 interfacing with battery cells 110 via various switches. One or more of the battery chargers 102 can be omitted, for example, a single battery charger 102 (e.g., the battery charger 102 of FIG. 1) can replace each depicted battery charger 102. Although not depicted for clarity, each of the battery chargers 102 can include or interface with a respective one of the controller 104 or the sensor 140 (e.g., various controllers can be in network communication with each other, or with the sensors). For example, the battery chargers 102 can interface with sensors 140 of or associated with various battery cells 110. The battery chargers 102 can be separate battery chargers 102, or separate rails of a single battery charger 102.

A vertical connection pair can couple respective terminals of each of the battery chargers 102. For example, the vertical connection pair can connect an anode and a cathode of the battery charger to an anode and a cathode, respectively, of each of the battery cells 110. A supply output switch for each of the battery chargers can selectively connect each battery charger 102 to the vertical connection. For example, the eleventh switch 166 can connect the first battery charger 102 to a first vertical connection; a twelfth switch 302, thirteenth switch 304, fourteenth switch 306, or fifteenth switch 308 can connect respective ones of the battery charger 102 to a respective second vertical connection, third vertical connection, fourth vertical connection, or fifth vertical connection. Put differently, the second switch 144, fourth switch 148, sixth switch 152, eighth switch 156, or tenth switch 160 can be disposed between a vertical connection pair for an associated battery cell 110 or battery charger 102. For example, the switches can be included in a series string 360

(e.g., a first series string) to interconnect the battery chargers 102 or battery cells 110 in series.

The first series string 360 can include switches intermediate to the second switch 144, fourth switch 148, sixth switch 152, eighth switch 156, or tenth switch 160. For example, a sixteenth switch 310 can intermediate the second switch 144 and the fourth switch 148. Each of a seventeenth switch 312, eighteenth switch 314, or nineteenth switch 316 (collectively, lower intermediation switches) can intermediate further vertical string pairs. For example, switches can intermediate the second switch 144, fourth switch 148, sixth switch 152, eighth switch 156, or tenth switch 160, or said switches can be omitted.

A second series string 362 can be located distal to the battery cells 110 or proximal to the battery chargers 102. The second series string 362 can include cross-terminal connections to connect the vertical pairs. For example, a twentieth switch 318, twenty-first switch 320, twenty-second switch 322, twenty-third switch 324, or twenty-fourth switch 326 (collectively, second series string switches) can connect the vertical string pairs. The second series string switches can be intermediated by a twenty-fifth switch 328, twenty-sixth switch 330, twenty-seventh switch 332, or twenty-eighth switch 334 (collectively, second series string intermediation switches).

The vertical string pairs can include in-line switches, which can selectively connect one or more of the string pairs. The in-line switches of each string pair can operate linked or independently. For example, the switches can include one or more interfaces to a controller to receive a signal to open or close. For example, a twenty-ninth switch 336 or thirtieth switch 338 can open or close, responsive to a same signal of the controller 104, or said switches can operate independently. Other in-line switches can include a thirty-first switch 340 and thirty-second switch 342, thirty-third switch 344 and thirty fourth switch 346, thirty fifth switch 348 and thirty sixth switch 350, or thirty-seventh switch 352 and thirty-eighth switch 354. The inline-switches can connect one or more of the battery cells 110 in a parallel configuration. For example, each of the in-line switches can close and each of the second series string intermediation switches or other switches between the vertical string pairs can open to connect each battery cell 110 to a respective battery charger 102. The battery charger 102 can provide a parallel charge current to various cells. The battery charger 102 can provide a constant voltage signal to each battery cell 110 or apply a varied voltage signal to the battery cells. For example, the battery charger 102 can apply a signal to grade the battery cell 110. The controller can provide identical or varied signals to the respective battery cells (e.g., responsive to sensor data).

The controller 104 can cause various data the controller 104 sends, receives, or processes to be stored in the data repository. For example, the controller 104 can cause a threshold for a group, a SoC or condition of the battery cell 110 or another indication of battery cell performance to be stored. The stored data can include sensor data, battery cell data, a position of the battery cell 110, a unique identifier of one or more battery cells 110, battery cell positions, or battery chargers 102. The controller 104 can adjust a threshold, group battery cells 110, or generate reports based on the stored data. The controller 104 can present the stored data via a user interface or network communication.

Each battery charger 102 can charge an associated battery cell in a parallel configuration. Each of the vertically depicted switches can be closed, and each of the horizontally depicted switches can be opened. For example, each of the thirteenth switch 304, thirty-fourth switch 346, thirty-third switch 344, or fifth switch 150 can be closed and each of the twenty-seventh switch 332, twenty second switch 322, twenty-sixth switch 330, seventeenth switch 312, sixth switch 152, or eighteenth switch 314 can be opened. The parallel configuration can be adapted to a series configuration by closing a lower intermediation switch or a second intermediation switch (e.g., the twenty-seventh switch 332 or the twenty-sixth switch 330) to connect parallel circuits in series. The battery charger 102 of one or more of the series circuit portions can supply current to the circuit, enter a high impedance state, or a battery charger disconnect switch (e.g., the fourteenth switch 306) can be opened.

Figure 4:
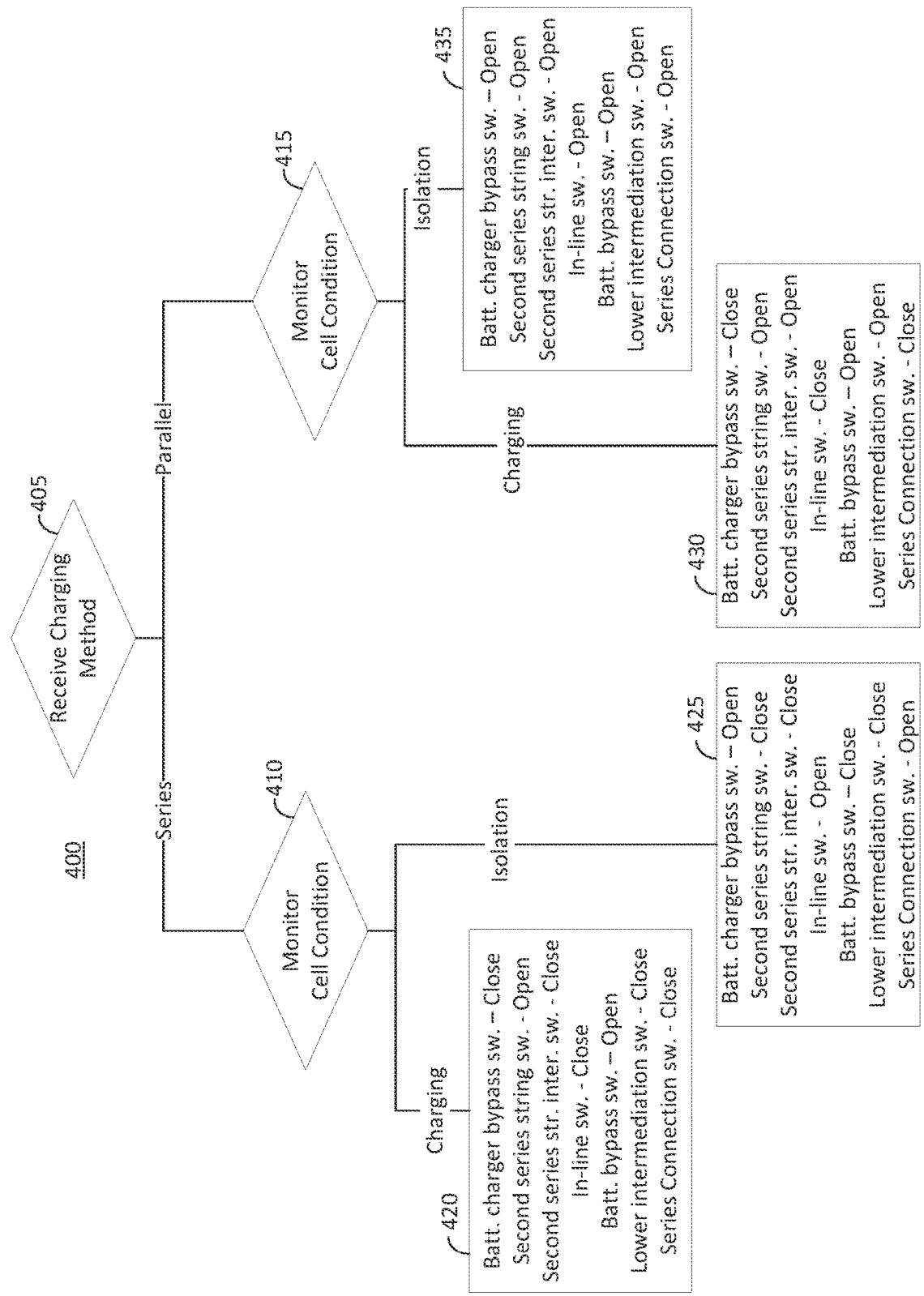
FIG. 4 depicts an example flowchart for a method of charging the various battery cells.

FIG. 4 depicts an example flowchart for a method 400 of charging the various battery cells 110. For example, the method can employ the system of FIG. 3, or another system having additional or fewer battery cells 110 or battery chargers 102. According to some switch configurations, the battery cell 110 or the battery charger 102 can be omitted or isolated from a circuit. Such isolation can include an isolation of one or more terminals of the battery cells 110 or battery chargers 102. For example, a negative terminal of each battery charger 102 can be an isolated or remain as a common terminal. The battery charger 102 can be isolated by opening one of the eleventh switch 166 twelfth switch 302, thirteenth switch 304, fourteenth switch 306, or fifteenth switch 308 (collectively, battery charger bypass switches).

At ACT 405, a charging method is received or determined by a controller 104. The controller 104 can determine the charging method based on a number of battery cells 110 disposed in a battery tray, a command received via a network connection or via a user interface. The charging method can be a series charging method or a parallel charging method and can include a charging profile such as a number of charge or discharge cycles, a charging rate, a target SoC, or the like. The controller 104 can determine the charging method according to sensor data associated with various battery cells 110. For example, the controller 104 can execute instructions to charge or discharge the battery cells 110 at a constant current, for battery cell formation, such as to form an solid electrolyte interface layer (SEI), and thereafter to charge at a constant voltage to determine a grade of the respective cells. The controller 104 can open the battery bypass terminal after a delay (e.g., a pre-defined time, or a delay based on a detected voltage) to charge the battery cells 110. The controller 104 can cause a charging current to be applied to the battery cells 110 for battery cell formation, such as to evaluate battery cell quality, grade battery cells 110, or identify or remove nonconforming battery cells.

At ACT 410, prior to, during, or subsequent to charging the series cells, the controller 104 can receive sensor data to determine the battery cell condition. The controller 104 can receive the data incident to a pre-defined polling frequency of the controller 104, or based on one or more thresholds being exceeded. Sensor data can be indicative of battery cells 110 which are operating within a temperature, voltage, or other threshold. For example, the sensor data can include a number of battery cells 110 to charge, or an estimated or measured voltage. The sensor data can include data associated with per-cell data or sensor data for a series combination of cells (e.g., voltage, temperature, SoC, or capacity). At ACT 415, prior to, during, or subsequent to charging the battery cells 110, the controller 104 can receive sensor data to determine the battery cell condition. For example, the sensor data can include any of the per-cell information received at ACT 410, or information associated with a series combination of cells, such as a total current for the battery cells 110 or a voltage variation between the battery cells 110. At ACT 410 or 420, the controller 104 can cause various information to be stored for one or more battery cells 110. For example, the controller can cause a grading, grouping (e.g., based on the grading), SoC, voltage, or other condition of the battery cell 110, battery charger 102, or switch to be stored in the data repository.

At ACT 420, responsive to the controller receiving sensor data indicative of expected operation, determining or receiving an indication of series operation, the controller 104 can charge or continue to charge the battery cells 110. For example, the controller 104 can cause the battery charger bypass switches to close, the second series string intermediation switches to close, the in-line switches to close, the lower intermediation switches to close, or the series connection switches to close. The controller can cause the second series string switches to open or the battery bypass switches to open. The battery charger 102 can apply the operating voltage to the series connection of battery cells 110. For example, a first terminal of one rail and a second terminal of a different rail can be energized, or each rail can be energized. Various groups of battery cells 110 can be charged simultaneously. For example, parallel strings of battery cells 110 can be charged (e.g., in an 8S3P, or 10S4P configuration). A number of parallel cells can be determined according to a power output of the battery charger 102 (e.g., a current or voltage thereof). The operating voltage can be a fixed or variable voltage. For example, the operating voltage can be a voltage profile between 0.25 and 4.5 volts per cell, and can include a constant current charge for at least a portion of the voltage profile. The voltage profile can include charge and discharge cycles (e.g., to develop a solid electrolyte interphase layer for the battery terminal). The battery charger 102 can alternate between providing or receiving energy from the battery cell at ACT 420.

At ACT 425, responsive to the receipt, by the controller 104, of sensor data indicative of the battery cell 110 which is not operating, or not operating similarly to other battery cells, the controller 104 can isolate one or more battery cells 110. For example, the controller 104 can cause the second series string switch to close, the second series string intermediation switches to close, the battery bypass switches to close, or the lower intermediation switch to close. The controller 104 can cause the battery charger bypass switch to open, the in-line switches to open, or the lower intermediation switches to open. The switches can be opened or closed on a per battery cell 110 basis. For example, the battery bypass switch (e.g., the sixth switch 152) associated with the battery cell 110 to be isolated can be closed and the series connection switch (e.g., the fifth switch 150) associated with the battery cell 110 can be opened. Other battery bypass switches can be open to maintain a series connection between other battery cells 110. The controller 104 can cause a delay between opening and closing of various switches to avoid undesired short circuits (e.g., between terminals of the battery charger 102 or the battery cell 110). The controller 104 can receive sensor data indicative of an overheating of a cell, or a voltage of a cell exceeding a threshold. The controller 104 can determine, based on the sensor data, that the battery cell 110 should be isolated. For example, the controller can determine that a cell having a voltage exceeding a threshold at 99% of an expected state of charge is charged, or that a cell having a voltage exceeding a threshold at 2% of an expected state of charge is non-conforming and should be removed. The controller 104 can cause an indication to be presented (e.g., via a user interface) to remove the battery cell or otherwise convey an indication of the condition of the battery cells 110.

At ACT 430, responsive to sensor data indicating expected operation, and a determination or receipt of parallel operation, the controller 104 can charge or continue to charge the battery cells 110. For example, the controller 104 can cause the battery charger bypass switches to close, the inline switches to close, or the series connection switches to close. The controller 104 can cause the second series string switches to open, the second series string intermediation switches to open, the battery bypass switches to open, or the lower intermediation switches to open. The controller 104 can cause each of the battery chargers 102 to provide a voltage controlled or current controlled signal to the battery cells 110. For example, the controller 104 can provide a signal to charge each of the cells, or to grade the cells. For example, the controller 104 can provide a constant current signal to the battery cells 104, or an AC signal to the battery cells 110 to grade or otherwise determine a condition associated with the battery cells 110.

AT ACT 435, responsive to the receipt, by the controller, of sensor data indicative of the battery cell which is not operating, is not operating similarly to other battery cells, or to monitor the cell (e.g., to detect an OCV of one or more of the battery cells) the controller 104 can isolate one or more battery cells 110. For example, the controller 104 can cause each of the switches to open. The opened switches can be on a per-cell basis, or all switches associated with the various battery cells 110 or battery chargers 102 can be opened. The switches associated with each of the battery cells 110 can be opened in a periodic or iterative fashion. For example, upon a completion of a charge or a grading, switches can be opened to isolate one or more battery cells 110. The switches can be opened for the battery cells iteratively until each of the battery cells 110 is complete (e.g., graded or charged). The controller 104 can convey an indication to replace one or more battery cells 110 to another controller 104 via network communication or via a user interface. For example, the controller can cause a charged or graded battery cell 110 to be replaced and a replacement battery cell 110 can thereafter be charged or graded.

Figure 5:
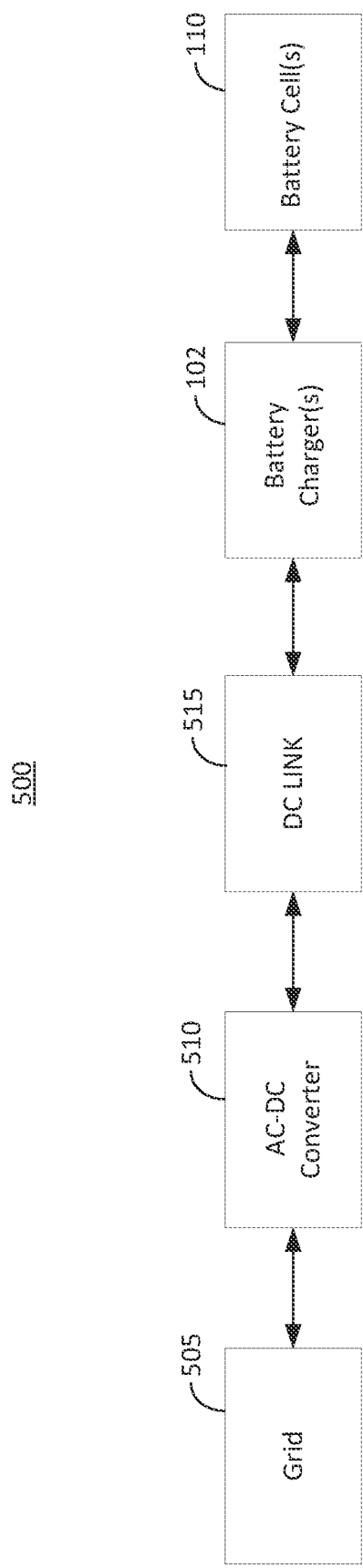
FIG. 5 depicts an example block diagram for a system for exchanging power between a grid and various battery cells.

FIG. 5 depicts an example block diagram of a system 500 for exchanging power between a grid 505 and various battery cells 110. The grid 505 can include a regional power grid, or a local solar or wind array. Energy can be exchanged with the grid 505 via AC or DC power. For example, an AC/DC converter 510 (e.g., an inverter or rectifier) can intermediate the grid 505 and a DC link 515 (e.g., a DC link 515 of a battery charging apparatus). The DC link 515 can exchange power with one or more battery chargers 102. Each battery charger 102 can be, include, or interface with a battery discharger. Each battery charger 102 can exchange power with one or more battery cells 110. For example, the battery charger 102 can charge one or more groupings of battery cells 110 in a series, parallel, or combinatorial circuit (e.g., 10S4P). The number of battery cells can be selected according to a voltage or current output of a battery charger 102 or another predetermined voltage (e.g., less than 50V). A battery charger 102 can exchange power with the DC link 515 at a voltage in excess of 50V, or apply a voltage to groupings of battery cells 110 at less than 50V. For example, ten battery cells 110 having a voltage of about 4.4V can be combined in a 10S configuration. A battery charger 102 having a maximum current of about 4.5 C, relative to battery cells 110 having a maximum charge rate of 1 C, can be configured to charge four parallel battery cells 110 or series configurations of battery cells 110.

Each battery charger 102 can operate in a charge or discharge mode of operation. For example, during a charge mode of operation, the battery charger 102 can receive power from the grid 505 (via the DC link 515) to charge an associated battery cell 110. During a discharge operation, the battery charger 102 can return power to the grid 505 (via the DC link 515) to discharge the battery cells 110. The battery charger 102 can alternate between charge and discharge modes of operation to form an SEI and otherwise form the battery cell 110. For example, cell formation can include evaluating battery cell quality (e.g., parameters), grading battery cells 110, or identifying or removing defective battery cells 110. The various battery chargers 102 can operate synchronous-symmetrically (e.g., all in a charge mode of operation, or all in a discharge mode of operation), or synchronous-asymmetrically (e.g., alternating between a charge and discharge operation, to reduce a peak power delivered to or received from the grid 505). The various battery chargers 102 can operate asynchronously, which can reduce inter-converter communications or avoid dwell time. A power factor correction circuit can interface with the grid 505. For example, the battery charger 102 or an inverter of the AC/DC converter 510 disposed between the grid 505 and the DC link 515 can generate a signal to adjust a demand or supply to the grid leading or lagging a signal thereof.

Figure 6:
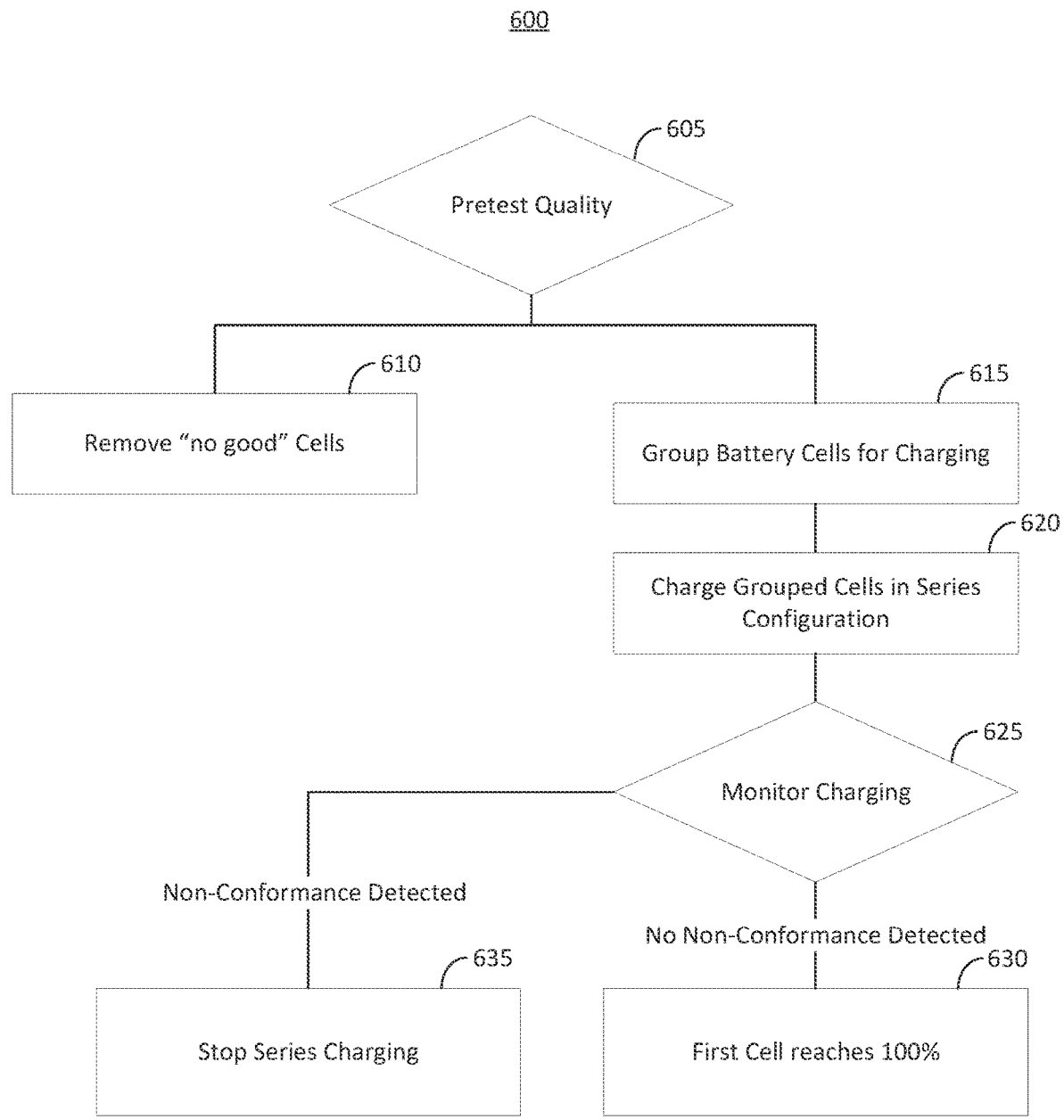
FIG. 6 depicts an example flowchart of a method for charging battery cells.

FIG. 6 depicts an example flowchart of a method 600 for charging battery cells 110. The method 600 can be performed by one or more components or systems depicted in FIG. 1, 3, 5, or 10 including, for example, a controller 104 associated with the battery charger 102. The method can likewise incorporate, substitute, or omit operations depicted throughout this disclosure. For example, although not explicitly listed as an ACT, the method 600 can include aging battery cells responsive to sensor data. At ACT 605, a quality of the battery cell 110 is tested. At ACT 610, battery cells 110 which are not selected for a group are removed. At ACT 615, battery cells 110 are selected for a group. At ACT 620, the grouped battery cells 110 are charged in series. At ACT 625, the condition of the battery cells 110 are monitored. At ACT 630, a first cell reaches 100% SoC. At ACT 635, the series charging is halted.

At ACT 605, a quality (e.g., condition) of the battery cell 110 is tested. For example, the controller 104 can monitor a condition of the battery 104 based on sensor data to pre-test the battery cell 110. The controller 104 can cause a signal to be applied to the battery cell 110, such as for an ACIR test, DCIR test, constant voltage application, thermal test, or other operation of the battery cell 110. The condition can be a binary test (e.g., pass/fail), or can categorize the battery cell 110 according to a condition or use. For example, the battery cell 110 can be associated with a high power delivery, high capacity, SoC range, or other condition which can be indicative of a group for an end-use of the battery cell 110, or formation of the battery cell 110.

At ACT 610, battery cells 110 which are not selected for a group are removed. For example, the cells can be removed for material recycling, aging, or for inclusion in a different group. A battery cell 110 may not be selected because a capacity, temperature, internal resistance, or other sensor data associated with the battery cell 110 exceeds a threshold. For example, the battery cell can be selected for a different group, or may not be employed in any group (e.g., can be recycled). An unselected battery cell 110 can be referred to as a "no good" cell, which can refer to the battery cell 110 being incompatible with one or more groups. At ACT 615, the controller can select the battery cells 110 for the group based on a number of cells, their relative properties, or properties relative to one or more thresholds or ranges (e.g., temperature, voltage, DCIR, ACIR or OCV). The number of selected battery cells 110 can be based on an attribute of the battery charger 102. The battery cells 110 can be selected by comparison to a total desired voltage in the circuit and a voltage level of a battery cell. The comparison can be to a pre-defined threshold (e.g., a voltage threshold of the battery cell 110) or based on the voltage variance between battery cells (e.g., a group of battery cells having a highest voltage, a lowest voltage, or having a least variance of voltage relative to a larger population). Although the selection criteria have been described with respect to voltage, the cells can be grouped according to another attribute (e.g., DCIR, ACIR, or temperature).

At ACT 620, the battery cells 110 are charged in series. The battery charger 102 can apply a constant or variable voltage over time to charge the battery cells 110. The voltage applied to the battery cells 110 can be based on sensor data associated with the battery cells 110 or sensor data associated with the battery charger 102 (e.g., a current delivered thereby). For example, the voltage can be adjusted to maintain a charging current range. The range can be defined by an upper or lower threshold. The thresholds can be based on a measured or expected capacity of the battery (e.g., a 10 C rate, 1 C rate, or 0.1 C rate). A controller 104 can actuate switches to cause the series connection of the battery cells 110, or avoid short circuiting (e.g., by imposing delays between actuating various switches). For example, a bypass switch can be closed subsequent to opening a series connection switch.

At ACT 625, the battery cells 110 are monitored. The monitored battery cells 110 can include cells undergoing charging or other cells (e.g., isolated cells). The monitoring can be prior to, during, or subsequent to charging the battery cells 110. The monitoring can be based the sensor data received from the sensor 140 during charging of the battery cells 110. For example, the application of a charging profile (e.g., voltage, current, or temperature limits), or the continued charging can be based on temperature data. For example, the controller 104 can continue a charging profile, responsive to sensor data (e.g., a current in a first range). The controller 104 can adjust the charging profile, responsive to sensor data (e.g., cause an increase or decrease of a voltage of the battery charger 102). The controller 104 can proceed to ACT 630 or 635, responsive to sensor data.

At ACT 630, the controller 104 determines that a first cell has reached a 100% SoC or other desired threshold. The controller 104 can determine the SoC based on various sensor data. For example, the controller 104 can determine the SoC based on a time, voltage, current, or temperature. The SoC can be temperature compensated. The controller 104 can cause the battery charger to halt charging responsive to the determination that a cell has reached 100% to avoid overcharging. For example, the controller 104 can cause the battery charger to reduce an output voltage or can actuate one or more switches to decouple the battery charger 102 from the series of battery cells 110. The controller 104 can cause an indication of the SoC of the cell, such as via a user interface (e.g., light emitting diode) or network communication.

At ACT 635, the controller 104 can detect a non-conformance of one or more battery cells. For example, the controller can detect a voltage, temperature, or performance of the battery cell 110, battery charger 102, or switch which does not conform to a range, threshold, or expected operation for any sensor data. For example, a variance in temperature between battery cells 110, or a current supplied by the battery charger 102 can exceed an upper threshold. The controller 104 can cause the charging to be halted according to a same of different method as employed at ACT 630. The controller 104 can cause an indication of the condition of the battery cell 110 or battery charger 102, such as via the user interface or network communication.

Figure 7:
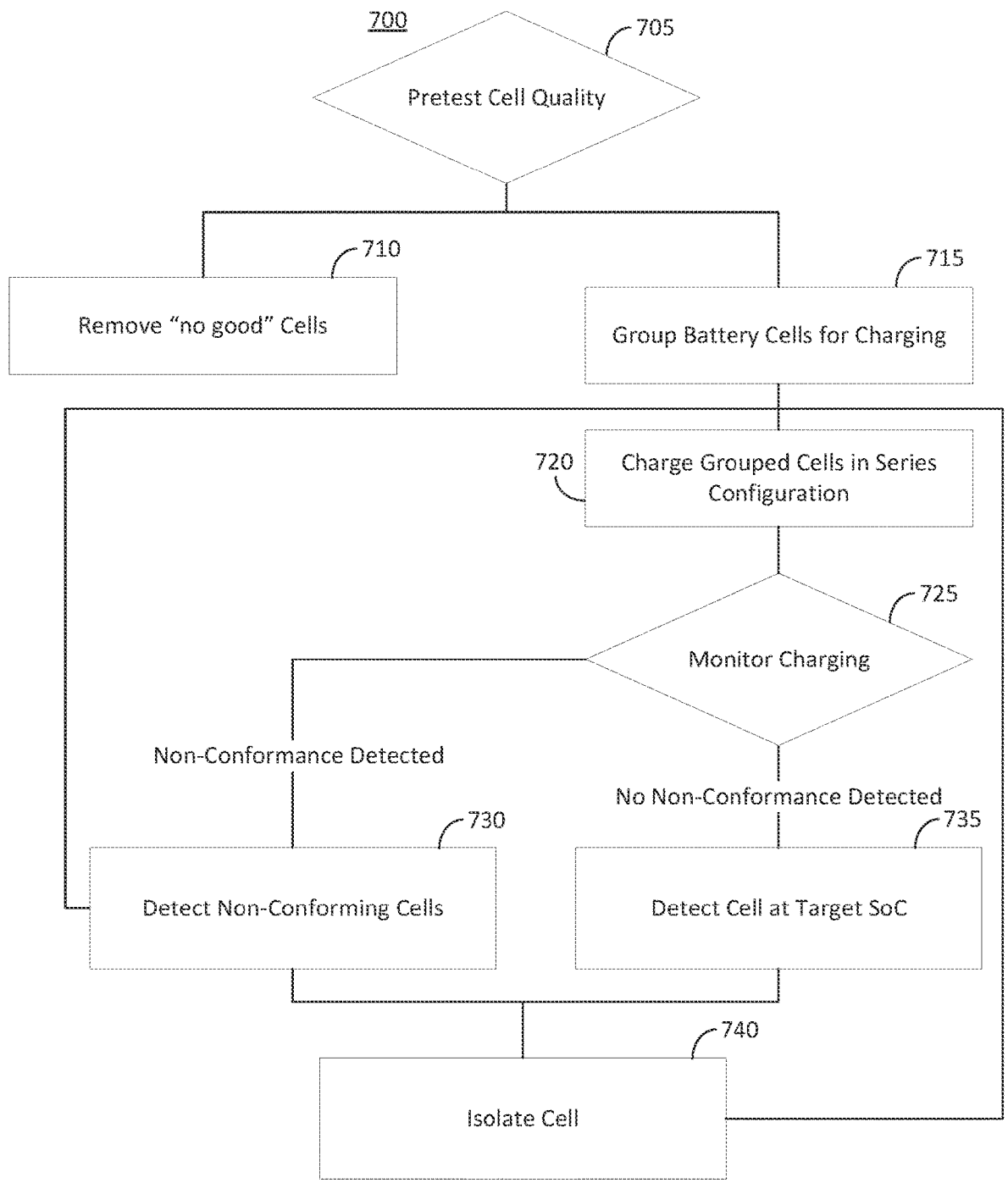
FIG. 7 depicts an example flowchart of a method for charging battery cells.

FIG. 7 depicts an example flowchart of a method 700 for charging battery cells 110. The method 700 can be performed by one or more components or systems depicted in FIG. 1, 3, 5, or 10 including, for example, a controller of the battery charger 102. The method can likewise incorporate, substitute, or omit operations depicted throughout this disclosure. Some ACTs of the method 700 include elements of corresponding ACTs of FIG. 6, and are thus only briefly described herein. Various substitutions, additions, or omissions can be made to these ACTs, like other systems and methods of the present disclosure. At ACT 705, a quality of the battery cell 110 is tested. At ACT 710, battery cells 110 which are not selected for a group are removed. At ACT 715, battery cells 110 are selected for a group. At ACT 720, the grouped battery cells 110 are charged in series. At ACT 725, the condition of the battery cells 110 are monitored.

At ACT 730, a non-conforming battery cell 110 is detected. A non-conforming battery cell 110 can refer to a battery cell 110 which does not meet one or more thresholds for one of more groups, such as in a particular group or in any group (e.g., an inoperable battery cell). The controller 104 can detect the non-conforming battery cell 110 based on a receipt of sensor data indicative of a condition of the battery cell 110. For example, a temperature, voltage, current, or other sensor data can indicate the cell does not conform to a range or threshold. The non-conformance can be based on an instantaneous or time-average value. The non-conformance can be indicative of the battery cell 110 which is unsuited for a current grouping but suitable for a different grouping (e.g., based on an internal resistance or capacity); a non-conformance threshold can be group based. The non-conformance can indicate the battery cell 110 is unsuitable for any grouping; a non-conformance threshold can be applied across various groups of battery cells 110. The controller 104 can cause an indication of the condition of the battery cell 110 or battery charger 102, such as via the user interface or network communication.

At ACT 735, the battery cell at a target SoC is detected. The controller 104 can determine the SoC based on various sensor data. For example, the controller 104 can determine the SoC based on a time, voltage, current, or temperature. The SoC can be temperature compensated. The controller 104 can cause the battery charger 102 to halt charging responsive to the determination that a cell has reached a target SoC to avoid overcharging. For example, the controller 104 can cause the battery charger 102 to reduce an output voltage or can actuate one or more switches to decouple the battery charger 102 from the series of battery cells 110. The controller can cause an indication of the SoC of the cell, such as via a user interface (e.g., light emitting diode) or network communication.

At ACT 740, the battery cell is isolated. For example, the controller 104 can isolate the battery cell 110 responsive to a determination that the battery cell 110 is non-conforming, or that the battery cell 110 has reached a target SoC (e.g., 100%). The controller 104 can isolate the cell by the actuation of various switches. For example, the controller 104 can cause the battery bypass switch to close, or a series connection switch to open. Additional, fewer, or different switches can be opened or closed according to various switch arrangements. For example, FIG. 3 depicts further switches which can be actuated to isolate (e.g., bypass) the battery cell 110. The controller 104 can cause an indication of the isolation of the battery cell 110, such as via the user interface or network communication. Incident to each isolation of the battery cell 110, the controller 104 can cause the battery charger 102 to reduce a voltage based on a remaining number of battery cells 110 and a condition thereof. For example, the battery charger 102 charging ten series cells at about forty volts (about four volts per cell), can be adjusted to about thirty-two volts (about four volts per cell) incident to an isolation of two battery cells 110. The various battery cells 110 can be isolated iteratively, until each of the battery cells is isolated. For example, zero or more battery cells 110 can be isolated for non-conformance, and zero or more battery cells 110 can be isolated upon reaching a target SoC until no cells remain. The controller 104 can cause an indication of the completion of charging via a user interface or network communication.

Figure 8:
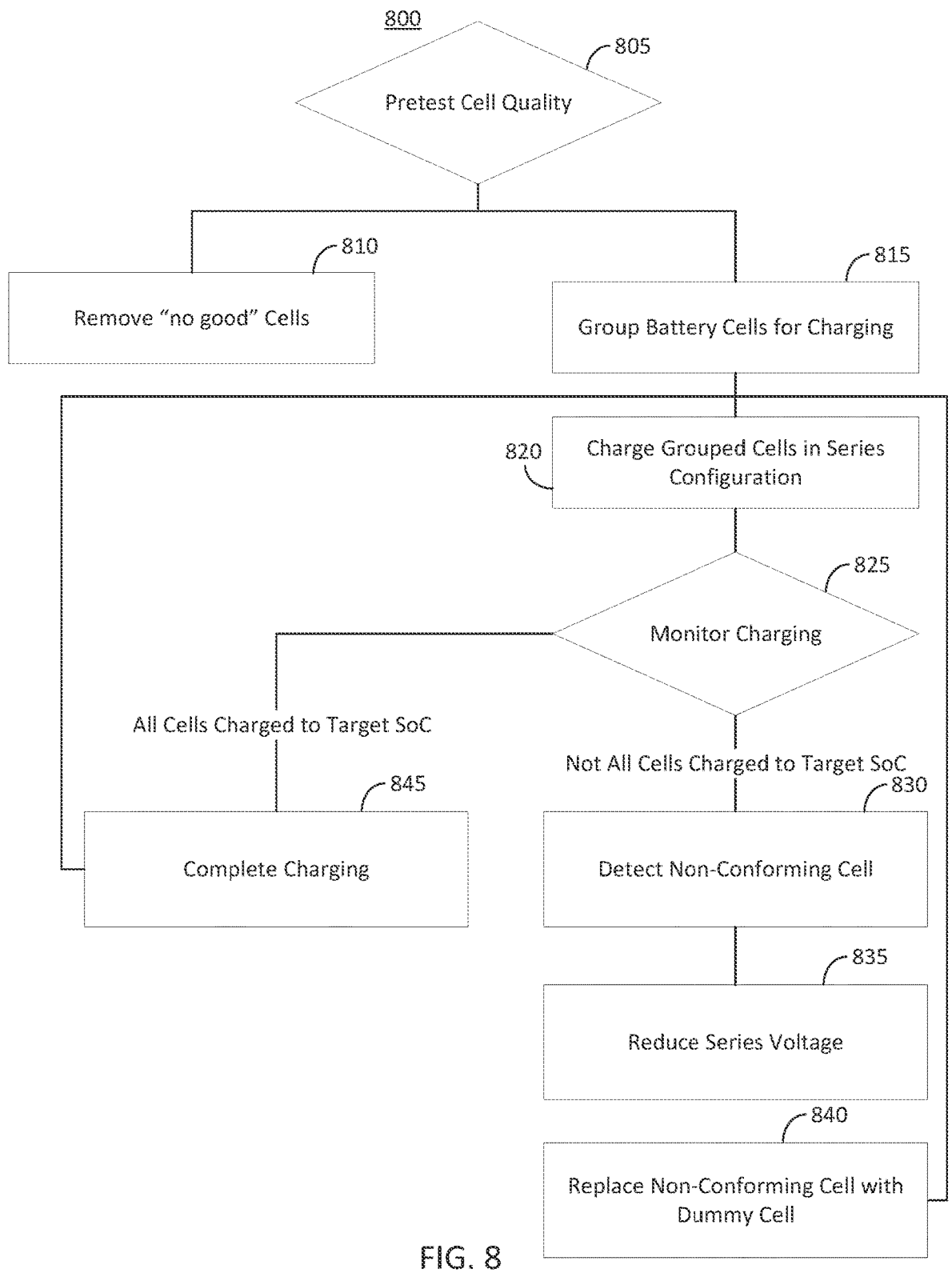
FIG. 8 depicts an example flowchart of a method for charging battery cells.

FIG. 8 depicts an example flowchart of a method 800 for charging battery cells 110. The method 800 can be performed by one or more components or systems depicted in FIG. 1, 3, 5, or 10 including, for example, a controller 104 of the battery charger 102. The method 800 can likewise incorporate, substitute, or omit operations depicted throughout this disclosure. Some ACTs of the method 800 include elements of corresponding ACTs of FIG. 6 or 7, and are thus only briefly described herein. Various substitutions, additions, or omissions can be made to those ACTs, like other systems and methods of the present disclosure. For example, the detection of non-conforming cells at ACT 830 can include an identification of the battery cell 110 reaching a target voltage (e.g., ACT 735) in advance of one or more additional cells. At ACT 805, a quality of the battery cell 110 is tested. At ACT 810, battery cells 110 which are not selected for a group are removed. At ACT 815, battery cells 110 are selected for a group. At ACT 820, the grouped battery cells 110 are charged in series. At ACT 825, the condition of the battery cells 110 are monitored. At ACT 830, a non-conforming battery cell 110 is detected.

At ACT 835, the series voltage of the battery charger is reduced. For example, the controller 104 can cause a reduction of the output of the battery charger. For example, the controller can cause a current output of the battery charger to be halted (e.g., by an actuation of the battery charger bypass switch), and can thereafter cause an adjustment of the voltage output of the battery charger 102. The reduction can take some time (e.g., based on capacitive or inductive elements of the battery charger 102). Subsequent to the voltage reduction, the controller 104 can cause the reduced series voltage to be applied to the remaining battery cells 110. The controller 104 can apply the reduced series voltage incident to the passage of a predefined amount of time (e.g., 100 milliseconds), or can sense an adjusted output voltage (e.g., according to a number and condition of battery cells 110). The controller 104 can bypass the one or more non-conforming battery cells 110 prior to the reapplication of the reduced voltage. The controller 104 can increase the charging voltage incident to an additional of the battery cell 110 (e.g., a replacement battery cell 110 for a non-conforming battery cell 110).

At ACT 840, a non-conforming battery cell 110 can be replaced with a dummy cell. The dummy cell can include mechanical or electrical features to interface with one or more sensors 140 (e.g., mechanical presence sensor, or electrical sensors). The dummy cell can be replaced subsequent to the isolation, such as to mechanically support a battery cell group. At ACT 845, charging of the battery cells is completed. The completion can indicate that all battery cells have been isolated, fully charged, or replaced by dummy cells. The controller 104 can cause an indication of the completion of charging via a user interface or network communication.

Figure 9:
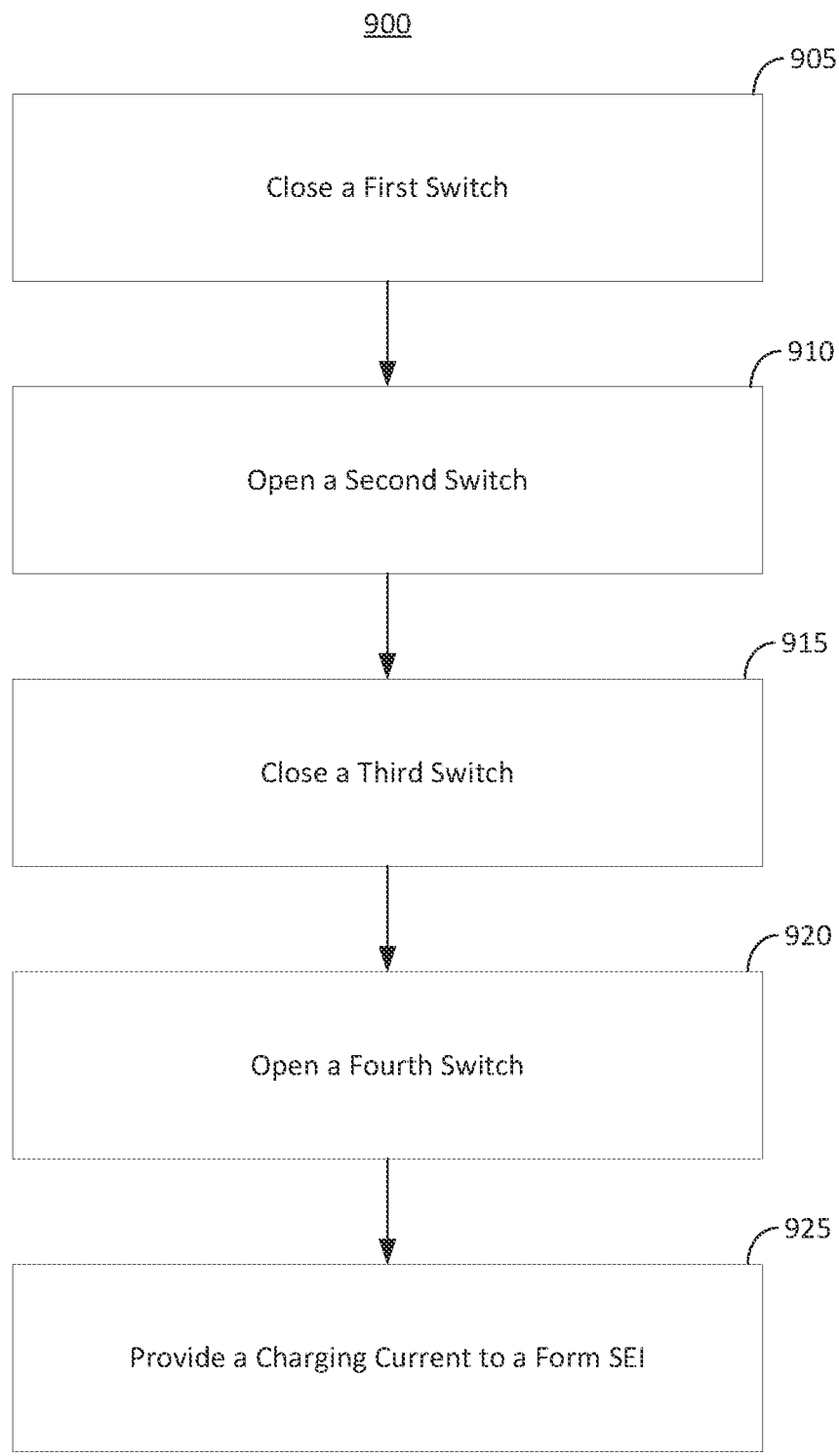
FIG. 9 depicts an example flowchart of a method for charging battery cells.

FIG. 9 depicts an example flowchart of a method 900 for charging battery cells 110. The method 900 can be performed by one or more components or systems depicted in FIG. 1, 3, 5, or 10 including, for example, a controller of the battery charger 102. The method 900 can likewise incorporate, substitute, or omit operations depicted throughout this disclosure. At ACT 905, a first switch is closed. At ACT 910, a second switch is opened. At ACT 915, a third switch is closed. At ACT 920, a fourth switch is opened. At ACT 925, a charging current is supplied to various battery cells 110 for battery cell formation (e.g., to form an SEI layer, evaluate battery cell quality, grade battery cells 110 or identify or remove nonconforming battery cells).

At ACT 905, a first switch is closed (e.g., to connect the second battery cell 110 to other battery cells of a series connection of battery cells or to a battery charger 102). The switch can close responsive to a receipt of a signal from a controller 104. The first switch can be a series connection switch disposed between a first terminal of the battery charger 102 and a second switch. For example, the first switch can be the first switch 142 of FIG. 1 or 3. Further connections, wiring, sensors, or other conductive bodies can intermediate the explicitly noted connections. The first switch can connect a first terminal of a first battery cell 110 to a battery charger 102. For example, the first battery cell 110, first switch, and second switch can connect to a same voltage node. The first switch can be closed at about a same time or subsequent to ACT 910 (e.g., to avoid a short circuit of the battery cell 110).

At ACT 910, the second switch is opened (e.g., to avoid short circuiting battery terminals of the first battery cell 110). The switch can open responsive to a receipt of a signal from the controller 104. The second switch can be the battery bypass switch disposed between a second terminal of the first battery cell 110 and a third switch. For example, the second switch can be the second switch 144 of FIG. 1 or 3. The second switch can connect the first battery cell 110 to another battery cell 110. For example, the second terminal of the first battery cell 110, a third switch, and a fourth switch can connect to a same voltage node.

At ACT 915, a third switch is closed (e.g., to connect the second battery cell 110 to other battery cells of a series connection of battery cells or to a battery charger 102). The switch can close responsive to a receipt of a signal from a controller 104. The third switch can be a series connection switch disposed between a second switch and a second terminal of the battery charger 102. For example, the third switch can be the third switch 146 or ninth switch 158 of FIG. 1 or 3. At ACT 920, a fourth switch is opened (e.g., to avoid short circuiting battery terminals of the first battery cell 110). The switch can open responsive to a receipt of a signal from the controller 104. The fourth switch can be the battery bypass switch disposed between a third switch and a second terminal of the battery charger 102. For example, the fourth switch can be the fourth switch 148 or tenth switch 160 of FIG. 1 or 3. At ACT 925, a charging current is suppled to various battery cells 110 for battery cell 110 formation. The charging current can alternate between charging and discharging battery cells 110 at a defined rate, voltage, or temperature, to form the SEI, or otherwise conduct battery cell formation. For example, one or more sensors 140 can detect a condition of the battery cell 110 during or upon the application of the charging current to evaluate battery cell quality, grade battery cells 110 or identify or remove nonconforming battery cells.

Figure 10:
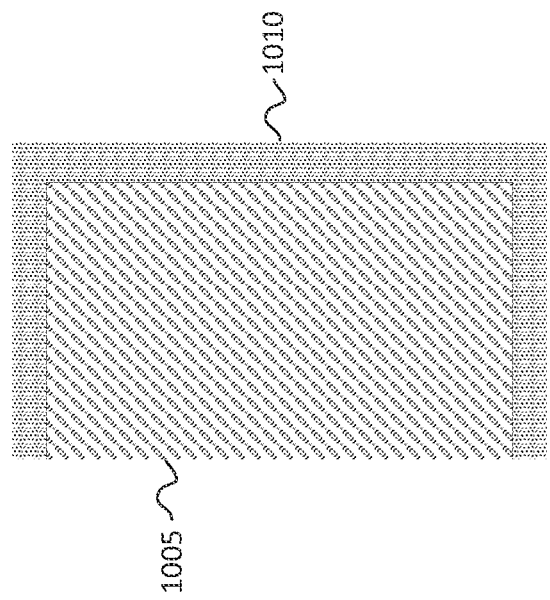
FIG. 10 depicts an example of a solid electrolyte interphase layer (SEI) formed over a battery terminal.

FIG. 10 depicts an example solid electrolyte interphase layer (SEI) 1010 formed over a battery electrode 1005. Each battery electrode 1005 can electrically connect to an exterior of a battery housing (e.g., a battery terminal). The battery electrode 1005 can be a battery anode or cathode (e.g., the SEI can include a cathode electrolyte interface). The battery electrode 1005 can, prior to formation, interface with a liquid electrolyte. Upon a charge or discharge cycle of the battery cell 110, an electrochemical reduction of the liquid electrolyte (e.g., electrolyte decomposition) can form an SEI. The SEI is a passivation layer formed on the electrode material. For example, the passivation layer can include graphitic active materials, lithium carbonate ($Li_2CO_3$) lithium fluoride (LiF), lithium oxide ($Li_2O$), or lithium hydroxide (LiOH). The passivation layer can passivate interactions between the solid and liquid interphase, which can reduce or eliminate further reduction reactions (e.g., oxidation). Thus, the SEI can reduce battery aging effects from charge/discharge cycles (e.g., cyclability), rate capacity, irreversible capacity loss, thermal performance, and the like. The SEI can be affected by a charging rate, temperature, time, or delay from wetting. Thus, the controller 104 can control various parameters of the battery charger 102 to form the SEI according to various thresholds or ranges thereof. For example, the parameter can include an OCV of the battery cells; a controller 104 action can cause or indicate removal of a battery cell 110 based on a nonconformance of the OCV thereof. The SEI can be formed during (e.g., as a part of) battery cell formation, which can include battery cell 110 quality evaluation, grading of battery cells 110, and/or identification or removal of nonconforming battery cells. The SEI can be formed prior to, during, or subsequent to other battery formation acts.

Figure 11:
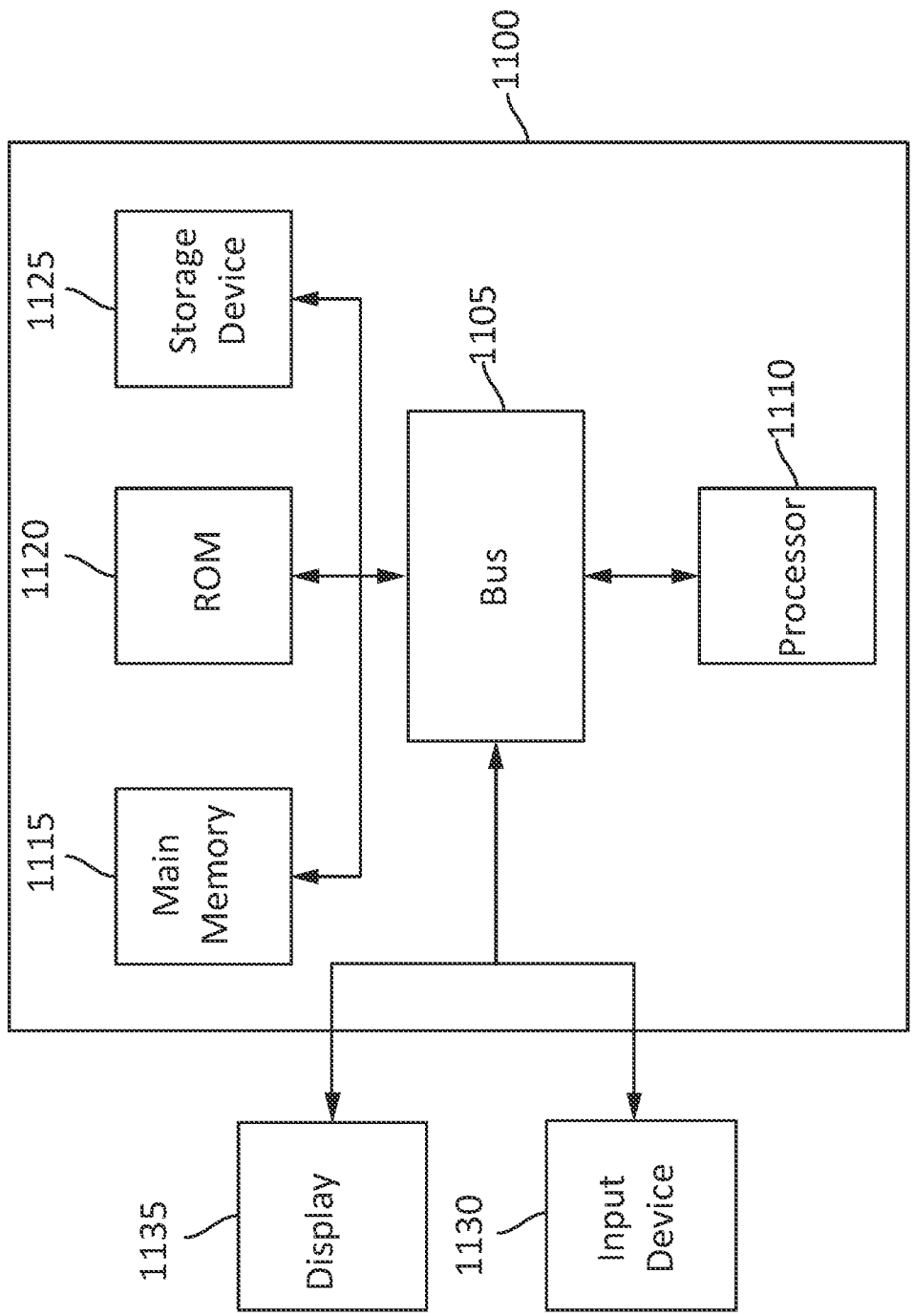
FIG. 11 is a block diagram illustrating an architecture for a computer system that can be employed to implement elements of the systems and methods described and illustrated herein.

FIG. 11 depicts a block diagram illustrating an architecture for a computer system that can be employed to implement elements of the systems and methods described and illustrated herein. The computer system or computing device 1100 can include or be used to implement a data processing system or its components. The computing system 1100 includes at least one bus 1105 or other communication component for communicating information and at least one processor 1110 or processing circuit coupled to the bus 1105 for processing information. The computing system 1100 can also include one or more processors 1110 or processing circuits coupled to the bus for processing information. The computing system 1100 also includes at least one main memory 1115, such as a random access memory (RAM) or other dynamic storage device, coupled to the bus 1105 for storing information, and instructions to be executed by the processor 1110. The main memory 1115 can be used for storing information during execution of instructions by the processor 1110. The computing system 1100 may further include at least one read only memory (ROM) 1120 or other static storage device coupled to the bus 1105 for storing static information and instructions for the processor 1110. A storage device 1125, such as a solid state device, magnetic disk or optical disk, can be coupled to the bus 1105 to persistently store information and instructions.

The computing system 1100 may be coupled via the bus 1105 to a display 1135, such as a liquid crystal display, or active matrix display, for displaying information to a user. An input device 1130, such as a keyboard or voice interface may be coupled to the bus 1105 for communicating information and commands to the processor 1110. The input device 1130 can include a touch screen display 1135. The input device 1130 can also include a cursor control, such as a mouse, a trackball, or cursor direction keys, for communicating direction information and command selections to the processor 1110 and for controlling cursor movement on the display 1135.

The processes, systems and methods described herein can be implemented by the computing system 1100 in response to the processor 1110 executing an arrangement of instructions contained in main memory 1115. Such instructions can be read into main memory 1115 from another computer-readable medium, such as the storage device 1125. Execution of the arrangement of instructions contained in main memory 1115 causes the computing system 1100 to perform the illustrative processes described herein. One or more processors in a multi-processing arrangement may also be employed to execute the instructions contained in main memory 1115. Hard-wired circuitry can be used in place of or in combination with software instructions together with the systems and methods described herein. Systems and methods described herein are not limited to any specific combination of hardware circuitry and software.

Although an example computing system has been described in FIG. 11, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, the first and second terminals of the battery cells, the battery charger, or the battery discharger can be inverted according to some aspects. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a first switch to connect a first terminal of a battery charger with a first terminal of a first battery cell;
a second switch to connect a second terminal of the first battery cell with a third switch, the second switch configured to connect a second battery cell with the first terminal of the battery charger;
the third switch to connect the second switch with a first terminal of the second battery cell;
a fourth switch to connect a second terminal of the second battery cell with a second terminal of the battery charger; and
the battery charger to provide a current to the first battery cell and to the second battery cell via the first switch and the third switch for battery cell formation of the first battery cell and the second battery cell.

2. The system of claim 1, comprising:
the first switch configured to remove the current from the first battery cell responsive to a detected condition of the first battery cell;
the second switch to connect the second battery cell to the first terminal of the battery charger responsive to the detected condition of the first battery cell;
the third switch configured to remove the current from the second battery cell responsive to a detected condition of the second battery cell; and
the fourth switch to connect the first battery cell to the second terminal of the battery charger responsive to the detected condition of the second battery cell.

3. The system of claim 1, comprising:
a first sensor to detect a first state of charge of the first battery cell;
a second sensor to detect a second state of charge of the second battery cell; and
a controller to operate at least one of the first switch or the third switch, responsive to the first state of charge or the second state of charge.

4. The system of claim 1, comprising:
the battery charger to comprise:
a first rail comprising the first terminal of the battery charger, and a third terminal of the battery charger; and
a second rail comprising the second terminal of the battery charger, and a fourth terminal of the battery charger;
a fifth switch between the first terminal of the battery charger and the third terminal of the battery charger to connect the second rail of the battery charger to the first battery cell;
a sixth switch between the second terminal of the battery charger and the fourth terminal of the battery charger to connect the second rail of the battery charger to the second battery cell;
a seventh switch between the second switch and the fifth switch to connect the first rail to the first battery cell;
an eighth switch between the sixth switch and the fourth switch to connect the second rail to the second battery cell; and
a ninth switch between the second switch and the fourth switch to isolate a circuit of the first rail and the first battery cell from a circuit of the second rail and the second battery cell.

5. The system of claim 1, comprising:
a first sensor to detect a first parameter of the first battery cell;
a second sensor to detect a second parameter of the second battery cell; and
a controller to operate at least one of the first switch or the third switch, responsive to the first parameter and the second parameter.

6. The system of claim 1, comprising:
a controller to detect a condition indicative of a removal of the first battery cell or the second battery cell from a series connection;
the controller to open a fifth switch between the battery charger and the first switch, responsive to the detection of the condition;
the controller to open the first switch or the third switch, subsequent to the opening of the fifth switch;
the controller to close the second switch or the fourth switch, responsive to the opening of the first switch or the third switch, respectively;
the battery charger to reduce an output voltage based on the removal of the first battery cell or the second battery cell from the series connection; and
the controller to close the fifth switch, responsive to the detection of the reduced output voltage.

7. The system of claim 1, comprising:
a controller to detect a condition indicative of a removal of one of the first battery cell or the second battery cell;
the controller to open a fifth switch between the battery charger and the first switch, responsive to the detection of the condition;
the controller to open the first switch or the third switch, subsequent to the opening of the fifth switch;
the controller to close the second switch or the fourth switch, responsive to the opening of the first switch or the third switch, respectively;
the battery charger to reduce an output voltage based on the removal of one of the first battery cell or the second battery cell;
the controller to close the fifth switch, responsive to a pre-defined time delay; and
the battery charger to provide the current at the reduced output voltage to an other of the first battery cell or the second battery cell.

8. The system of claim 1, comprising a controller to:
determine a number of battery cells in a series connection based on a parameter of at least one of the first switch, the second switch, the third switch, the fourth switch, or a fifth switch and a predetermined total voltage in the series connection.

9. The system of claim 1, comprising:
a sensor to detect a parameter of each of a plurality of battery cells; and
a controller to identify a subset of the plurality of battery cells, including the first battery cell and the second battery cell, based on the parameter to charge simultaneously.

10. The system of claim 1, wherein the battery charger comprises:
a first rail connected to the first battery cell via a first string pair;
a second rail connected to the second battery cell via a second string pair;

a first in-line switch intermediate to the first rail and the first battery cell along the first string pair; and
a second in-line switch intermediate to the second rail and the second battery cell along the second string pair.

11. The system of claim 1, comprising:
the battery charger to provide energy to the first battery cell and the second battery cell via the current in a first mode of operation; and
the battery charger to receive energy from the first battery cell and the second battery cell via the current in a second mode of operation.

12. A system, comprising:
a first switch to connect a first terminal of a battery discharger with a first terminal of a first battery cell;
a second switch to connect a second terminal of the first battery cell with a third switch, the second switch configured to connect a second battery cell with the first terminal of the battery discharger;
the third switch to connect the second switch with a first terminal of the second battery cell;
a fourth switch to connect a second terminal of the second battery cell with a second terminal of the battery discharger; and
the battery discharger to receive a current from the first battery cell and from the second battery cell via the first switch and the third switch for battery cell formation of the first battery cell and the second battery cell.

13. The system of claim 12, comprising:
the first switch configured to remove the current from the battery discharger responsive to a detected condition of the first battery cell;
the second switch to close to connect the second battery cell to the first terminal of the battery discharger responsive to the detected condition of the first battery cell;
the third switch configured to remove the current from the battery discharger responsive to a detected condition of the second battery cell; and
the fourth switch to connect the first battery cell to the second terminal of the battery discharger responsive to the detected condition of the second battery cell.

14. The system of claim 12, comprising:
a first sensor to detect a first parameter of the first battery cell;
a second sensor to detect a second parameter of the second battery cell; and
a controller to operate at least one of the first switch or the third switch, responsive to the first parameter or the second parameter.

15. The system of claim 12, comprising:
a controller configured to determine a number of battery cells in a series connection based on parameter of at least one of the first switch, the second switch, the third switch, the fourth switch, or a fifth switch and a predetermined total voltage in the series connection.

16. A method, comprising:
closing a first switch to connect a first terminal of a battery charger to a first terminal of a first battery cell;
opening a second switch between a second terminal of the first battery cell and a third switch;
closing the third switch to connect the second terminal of the first battery cell to a first terminal of a second battery cell;
opening a fourth switch between a second terminal of the first battery cell and a second terminal of the battery charger; and
providing a current to the first battery cell and to the second battery cell via the first switch and the third switch for battery cell formation of the first battery cell and the second battery cell.

17. The method of claim 16, comprising:
monitoring a first state of charge of the first battery cell;
measuring a second state of charge of the second battery cell; and
operating at least one of the first switch or the third switch, responsive to the first state of charge and the second state of charge.

18. The method of claim 16, comprising:
monitoring a first parameter of the first battery cell;
monitoring a second parameter of the second battery cell;
opening the first switch to disconnect the first terminal of the battery charger from the first terminal of the first battery cell; and
closing the second switch to connect the first terminal of the battery charger to the second battery cell.

19. The method of claim 16, comprising:
measuring a parameter of the first battery cell;
comparing the measurement to a predefined threshold;
opening a fifth switch between the second switch and the first terminal of the battery charger to arrest the current, responsive to the comparison;
opening the first switch or the third switch, subsequent to the opening of the fifth switch;
closing the second switch or the fourth switch, responsive to the opening of the first switch or the third switch, respectively;
adjusting a voltage output of the battery charger; and
closing the fifth switch to restore the current.

20. The method of claim 16, comprising:
detecting a parameter of each of a plurality of battery cells; and
identifying a subset of the plurality of battery cells, including the first battery cell and the second battery cell, based on the parameter to charge simultaneously.

* * * * *